United States Patent [19]

Yoshida

[11] Patent Number: 5,343,919
[45] Date of Patent: Sep. 6, 1994

[54] PNEUMATIC RADIAL TIRE WITH SPECIFIED BELT CURVATURE

[75] Inventor: Masanao Yoshida, Akashi, Japan

[73] Assignee: Sumitomo Rubber Industries, Ltd., Kobe, Japan

[21] Appl. No.: 917,961

[22] Filed: Jul. 24, 1992

[30] Foreign Application Priority Data

Aug. 26, 1991 [JP] Japan .................................. 3-240397
Jun. 9, 1992 [JP] Japan .................................. 4-176269

[51] Int. Cl.$^5$ .......................... B60C 3/00; B60C 9/28; B60C 11/00
[52] U.S. Cl. ................. 152/209 R; 152/454; 152/538
[58] Field of Search ............. 152/454, 538, 209 R, 152/209 B

[56] References Cited

U.S. PATENT DOCUMENTS 5,058,643 10/1991 Nakasaki .................. 152/209 B

FOREIGN PATENT DOCUMENTS 55-145008 11/1980 Japan .................................. 152/538
58-112805 7/1983 Japan .................................. 152/454

Primary Examiner—Michael W. Ball
Assistant Examiner—Adrienne C. Johnstone

[57] ABSTRACT

A pneumatic radial tire with a sum of tire maximum width W and tire maximum diameter D defined in a range from 750 mm to 1250 mm has a belt layer disposed radially outside a carcass. On the tire meridian section, a tread surface is curved along a single arc with a curvature radius TR1 having a center on the tire's equatorial plane, and a radially outer surface of the belt layer is curved along a single arc with a curvature radius BR1 having a center on the tire's equatorial plane. The curvature radius TR1 is larger than the curvature radius BR1, and a product of the curvature radius TR1 and the curvature radius BR1, that is, (TR1×BR1) is in a range from $33.7 \times 10^4$ mm$^2$ to $45.0 \times 10^4$ mm$^2$.

1 Claim, 5 Drawing Sheets

PNEUMATIC RADIAL TIRE WITH SPECIFIED BELT CURVATURE

The present invention relates to a pneumatic radial tire capable of enhancing the durability of the tread part by improving the buckling resistance of the tread part.

BACKGROUND OF THE INVENTION

In the tires for small trucks or the like, and tires for four-wheel drive vehicles designed to run off the road in the muddy or sandy field such as Jeeps, they are often used at low internal pressure in order to maintain stability of traveling and comfort of riding. Such tires for small trucks tend to have low aspect ratio as the load increases. Or four-wheel drive vehicles running in the muddy or sandy fields are promoted in this tendency in order to improve the floating performance.

As a result of increasing the ground contact surface by employing this low aspect ratio, however, the ground contact pressure is decreased. Further, the belt layer is repeatedly subjected to bending deformation in the tire radial direction in traveling, so that breakage in the circumferential direction known as buckling is often caused in the end portion of the belt layer or near the groove bottom.

Usually, in the tires for small trucks and four-wheel drive vehicles, in order to decrease the deformation of the belt layer, the center part of the tread is formed in a greater thickness than the tread shoulder part. And therefore in the tires subjected to heavy load as used in Jeeps or the like, the rubber thickness is abnormally large in the center part, and the tire weight increases, and the cost also soars.

It has been hence required to have the tire constitution capable of protecting the belt layer from damage without abnormally increasing the thickness of the rubber in the tread part.

SUMMARY OF THE INVENTION

The inventor, as a result of intensive researches to solve the above problems, noticed the mutual relationship between the curvature radius of the tread surface and the curvature radius of the belt layer which had not been considered previously, and completed the invention.

It is hence a primary object of the invention to present a pneumatic radial tire capable of enhancing the durability of the tire by preventing damages due to buckling of the belt layer by defining the mutual relationship between the curvature radius of the tread surface and the curvature radius of the belt layer.

According to one aspect of the present invention, a pneumatic radial tire having a sum of tire maximum width W and tire maximum diameter D defined in a range from 750 mm to 1250 mm and, comprising a carcass extending from a tread part through sidewall parts and turned up around a bead core in each of two bead parts, and a belt layer composed of at least one belt ply disposed radially outside the carcass. On the tire meridian section, a tread surface is curved along a single arc with a curvature radius $TR_1$ having a center on the tire's equatorial plane, a radially outer surface of the belt layer is curved along a single arc with a curvature radius $BR_1$ having a center on the tire's equatorial plane, the curvature radius $TR_1$ is larger than the curvature radius $BR_1$, and a product of said curvature radius $TR_1$ and the curvature radius $BR_1$, that is, $(TR_1 \times BR_1)$ is in a range from $33.7 \times 10^4$ mm$^2$ to $45.0 \times 10^4$ mm$^2$.

The tread radius of curvature $TR_1$ is greater than the belt radius of curvature $BR_1$. Therefore, the rubber thickness of the tread center part TC is less than the rubber thickness of the tread shoulder part TS near the tread edge TE. As a result, by setting the tread radius of curvature $TR_1$ greater than the belt radius of curvature $BR_1$ as shown in FIG. 2(A), the tread surface is flat and the belt layer is convex, swollen outward in the radial direction in the center part, as shown in FIG. 2(B) when landing, or loaded.

On the other hand, if the tread radius of curvature $TR_1$ is smaller than the belt radius of curvature $BR_1$, as the load applied from the unloaded state in FIG. 3(A), the tread part surface is flattened, and the belt layer (b) is deformed concavely, indented inward in the radial direction in the center part as shown in FIG. 3(B). This deformation is repeated in the unloaded state and loaded state upon every landing and nonlanding during traveling of the tire. And therefore the belt layer (b) repeatedly has convex curvature and concave curvature. As a result, tension and compression are repeatedly applied to the belt cords, the end portion of the belt layer (b) is peeled, and the belt cord itself is cut off by fatigue breakdown, and the so-called buckling performance is lowered and the durability is extremely lowered. This tendency is particularly notable when the belt cord is made of rigid material, such as steel.

Here, the buckling performance refers to the phenomenon of cutting off in the tire circumferential direction due to bending in the vicinity of the groove bottom or belt layer end part as the belt layer is repeatedly subjected to strain or buckling in the course of traveling. And as the method of evaluating the buckling performance, as shown in FIG. 4, the tire (t) assembled in the rim is held in loaded state, and a lateral force (f) is applied to the tire (t) in the tire axial direction, and the caused lifting of the belt layer (b) is measured.

To measure the lifting of the belt layer (b), for example, a test tire (t) exposing the belt layer by removing the tread rubber by more than the landing length in the tire axial direction and 10 mm in the circumferential direction is landed, and a lateral force (f) is applied to the tire (t). Before and after the application of the lateral force (f), the distances (y1) and (y2) from the landing surface (l) and belt layer (b) are measured by using gypsum, and the distance (y1) before application is subtracted from the distance (y1) after application of the lateral force (f), and the obtained difference is defined as the buckling amount Y.

A plurality of trial tires were fabricated in the tire size of $31 \times 10.5$ R 15, with the tread radius of curvature $TR_1$ greater than the belt radius of curvature $BR_1$, the tires were mounted on rims of $7JT \times 15$ and inflated with 2.0 kgf/cm$^2$ and loaded with 0.980 kfg, the buckling amount Y was measured, and the correlation between the product of tread radius of curvature and belt radius of curvature $(TR_1 \times BR_1)$ and the buckling amount Y was investigated. The result of investigation is indicated by the diamond mark in the graph in FIG. 5. As understood from the graph, between the product of two radii $(X = TR_1 \times BR_1)$ and the buckling amount Y, there is a relation represented by a line L expressed as:

$$Y = 10.372 - 0.2481 \times 10^4 \times X$$

(correlation factor 0.988).

If both the tread radius of curvature TR1 and belt radius of curvature BR1 are big, the defined value of the buckling amount Y may be satisfied. However, as the tread radius of curvature TR1 is big, the shoulder ground contacting length of the tread part increases and the shoulder ground contact pressure becomes large. As the result, the premature wear of the tread center is caused. Besides, the tread part is locally deformed by landing; a local deformation is caused in the belt layer and tread rubber; and the tread part may be broken by this deformation. It is therefore preferable for wear resistance to increase both the tread radius of curvature TR1 and belt radius of curvature BR1, that is, to be closer to flatness. And if the buckling amount Y is less than 2.00 mm, there is no risk of breakage of the belt layer. As a result, the product of two radii (TR1×BR1) as the intersection P of the 2.00 mm level line H of the buckling amount Y and the line L is defined at $33.7 \times 10^4$ mm$^2$ or more.

By defining the product of two radii (TR1×BR1) larger than $33.7 \times 10^4$ mm$^2$, the floating effect in traveling on muddy or sandy field is enhanced, and the traveling performance on a soft ground is improved.

On the other hand, if the product (TR1×BR1) of the tread radius of curvature TR1 and belt radius of curvature BR1 exceeds $45.0 \times 10^4$ mm$^2$, the landing surface spreads extremely in the tire axial direction, and steering stability is lowered in straight traveling and turning is lowered especially in on-road traveling.

BRIEF DESCRIPTION OF THE DRAWINGS

An embodiment of the present invention will now be described by way of example, referring the attached drawings, in which.

DETAILED DESCRIPTION OF THE INVENTION

Figure 1:
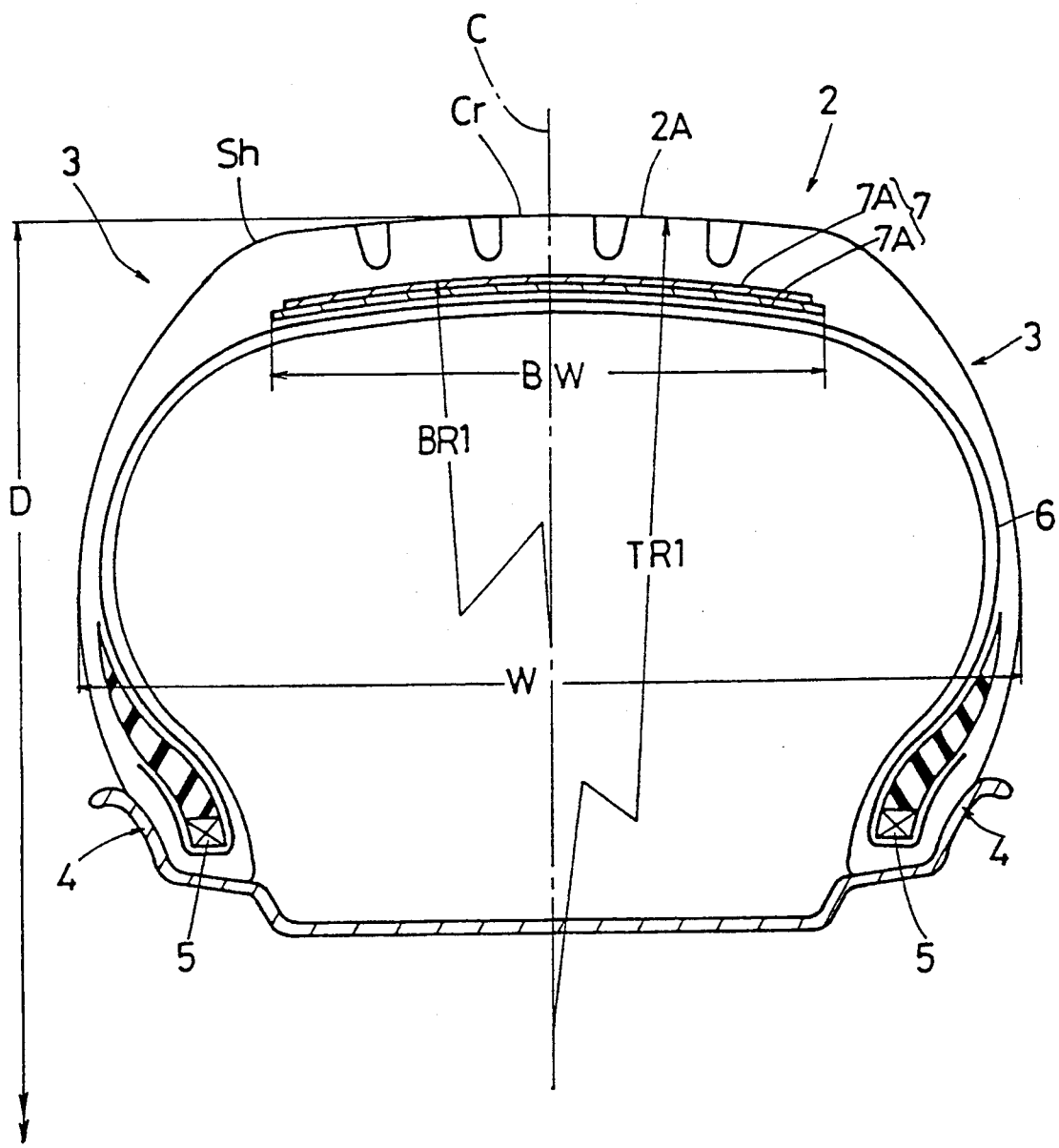
FIG. 1 is a sectional view showing an embodiment of the invention.
Figure 2A:
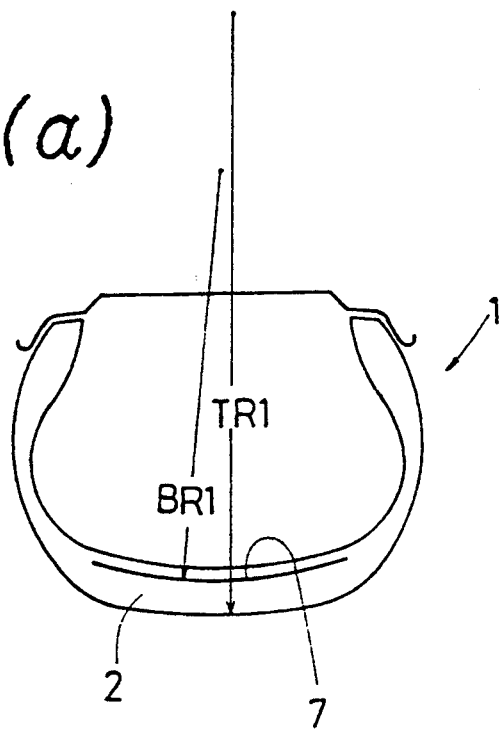
FIG. 2 is a sectional view showing the action, in noncontact state (A) and ground contact state (B)
Figure 2B:
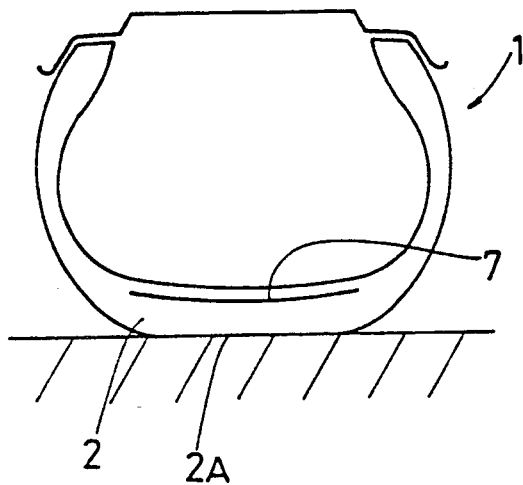

In the drawing, a pneumatic radial tire 1 has the sum (W+D) of the tire maximum width W and tire maximum diameter D defined in a range from 750 mm to 1250 mm. Therefore, the tire sizes for use at low internal pressure and high load Include tires for small trucks and four-wheel drive vehicles are such as 31×10.50R15, 32×12.50R15. The pneumatic radial tire 1 comprises a carcass 6 extending from a tread part 2 for forming a tread surface 2A through sidewall parts 3 and turned up around a bead core 5 in each of two bead parts 4, and a belt layer 7 disposed radially outside the carcass 6.

The carcass 6 is composed of one or plural, one in this embodiment, carcass plies in radial or semiradial structure wherein carcass cords are arranged at an inclination angle of 70 to 90 deg. to the tire equator C. The carcass cords are composed of organic fibers such as nylon, rayon, polyester, and aromatic polyamide fiber, or steel.

The belt layer 7 is composed of one or plural, two in this embodiment, belt plies 7A, 7A. And each belt ply 7A is, same as the carcass ply, formed by belt cords composed of organic fibers, such as nylon, rayon, polyester, and aromatic polyamide fiber, or steel. The belt cords cross to each other between the plies.

The tread surface 2A extends along a single arc having a specific radius of curvature TR1 centered on the tire's equatorial plane C. And a radially outer surface of the belt layer 7 also extends along a single arc having a specific radius of curvature BR1 centered on the tire equatorial plane C.

In the embodiment, the radius of curvature TR1 of the tread surface is defined in a range of 581 to 1000 mm. If the radius of curvature TR1 is less than 581 mm, the deviation of the belt layer becomes large between when the tire is loaded and when the tire is unloaded, and the durability is inferior. If exceeding, the traveling performance is lowered when traveling rough field.

The belt layer 7 has a belt width BW in the tire axial direction, in this embodiment, defined in a range of 0.6 to 0.85 times the tire maximum width W. If less than 0.6 times, the lateral rigidity of the tread part is lowered. If over 0.85, the rolling resistance decreases and the steering stability is improved, but uneven wear is caused and the durability is lowered.

The radius of curvature BR1 of the belt layer 7 is set smaller than the tread radius of curvature TR1. In the tread part 2, therefore, the rubber between the outside of the belt layer 7 and the tread part 2A is formed thinner in the rubber thickness of the tread central part Cr than the rubber thickness of the tread shoulder part Sh.

Figure 3A:
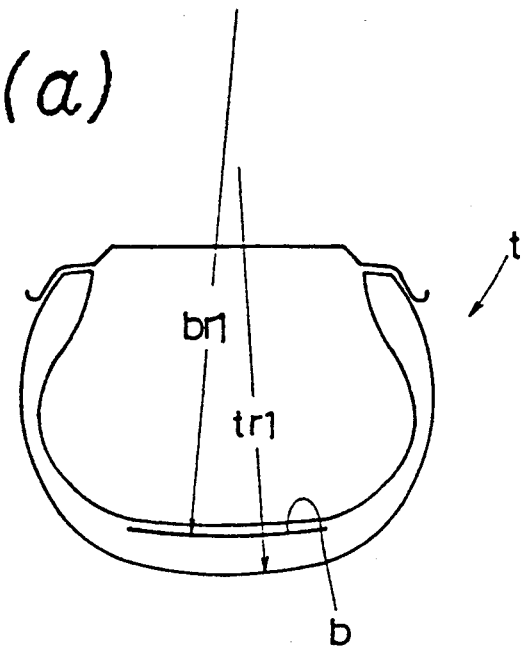
FIG. 3 is a sectional view showing the action of a conventional tire, in non-contact state (A) and ground contact state (B)
Figure 3B:
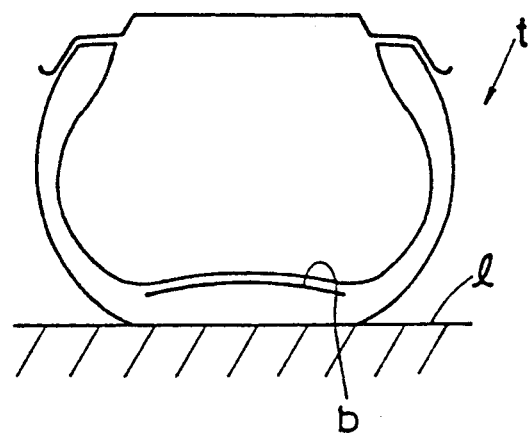
Figure 4:
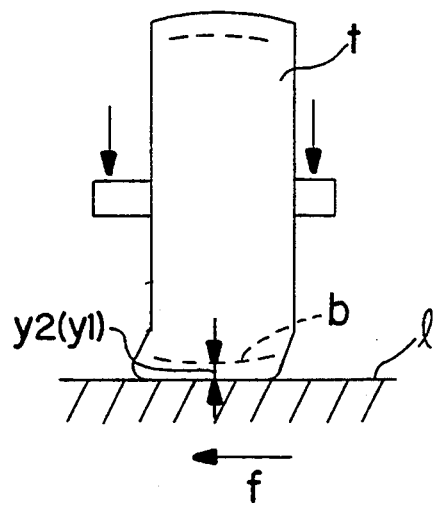
FIG. 4 is a front view showing the measuring method of the buckling amount.
Figure 5:
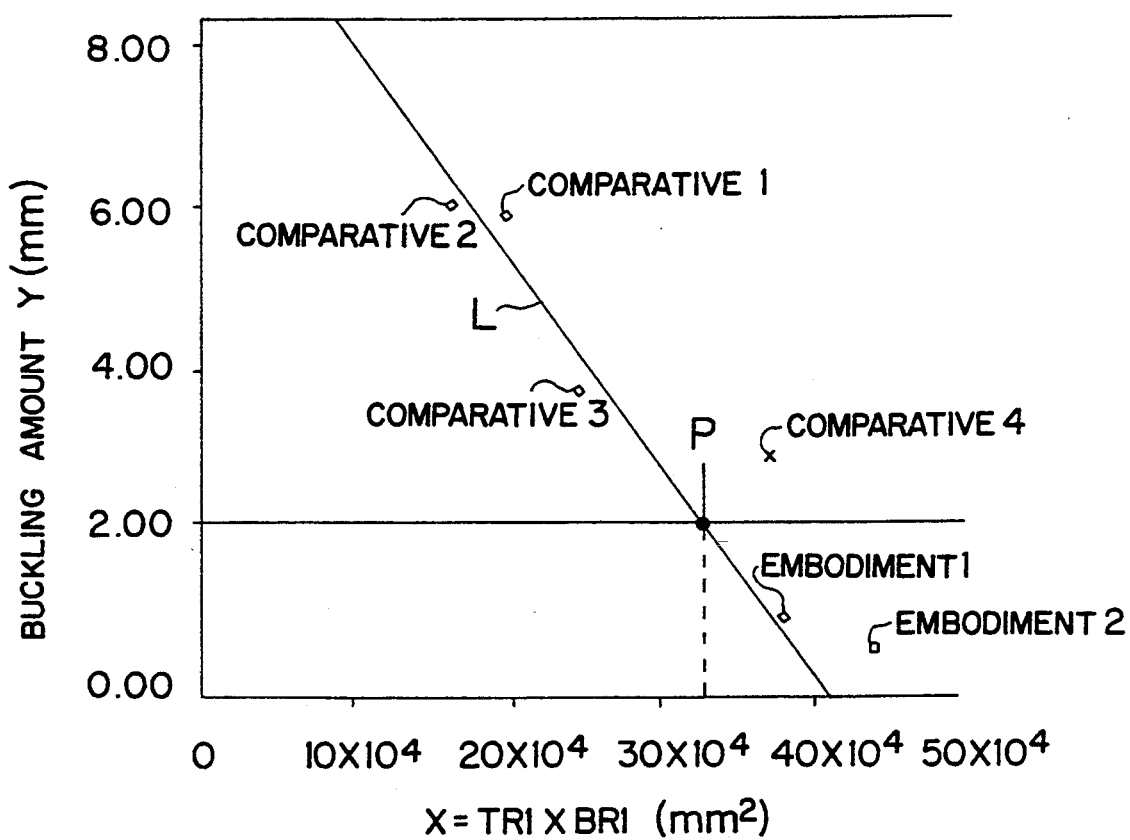
FIG. 5 is a graph showing the relation of the buckling amount with the product of tread radius of curvature and belt radius of curvature.

If the belt radius of curvature BR1 is larger than the tread radius of curvature TR1, the belt layer is reversely warped when loaded as shown in FIG. 3(B), and buckling is likely to occur. If the belt radius of curvature BR1 is smaller than 395 mm, the steering stability may be lowered.

As for the tread radius of curvature TR1 and belt radius of curvature BR1, the product of the both radii of curvature (TR1×BR1) is set in a range of $33.7 \times 10^4$ mm$^2$ to $45.0 \times 10^4$ mm$^2$. By defining the upper limit and lower limit of the product of the two radii of curvature (TR1×BR1), the buckling resistance is enhanced without sacrificing the tire traveling performances, and the belt layer 7 Is protected from breakage which the durability is enhanced.

Figure 6:
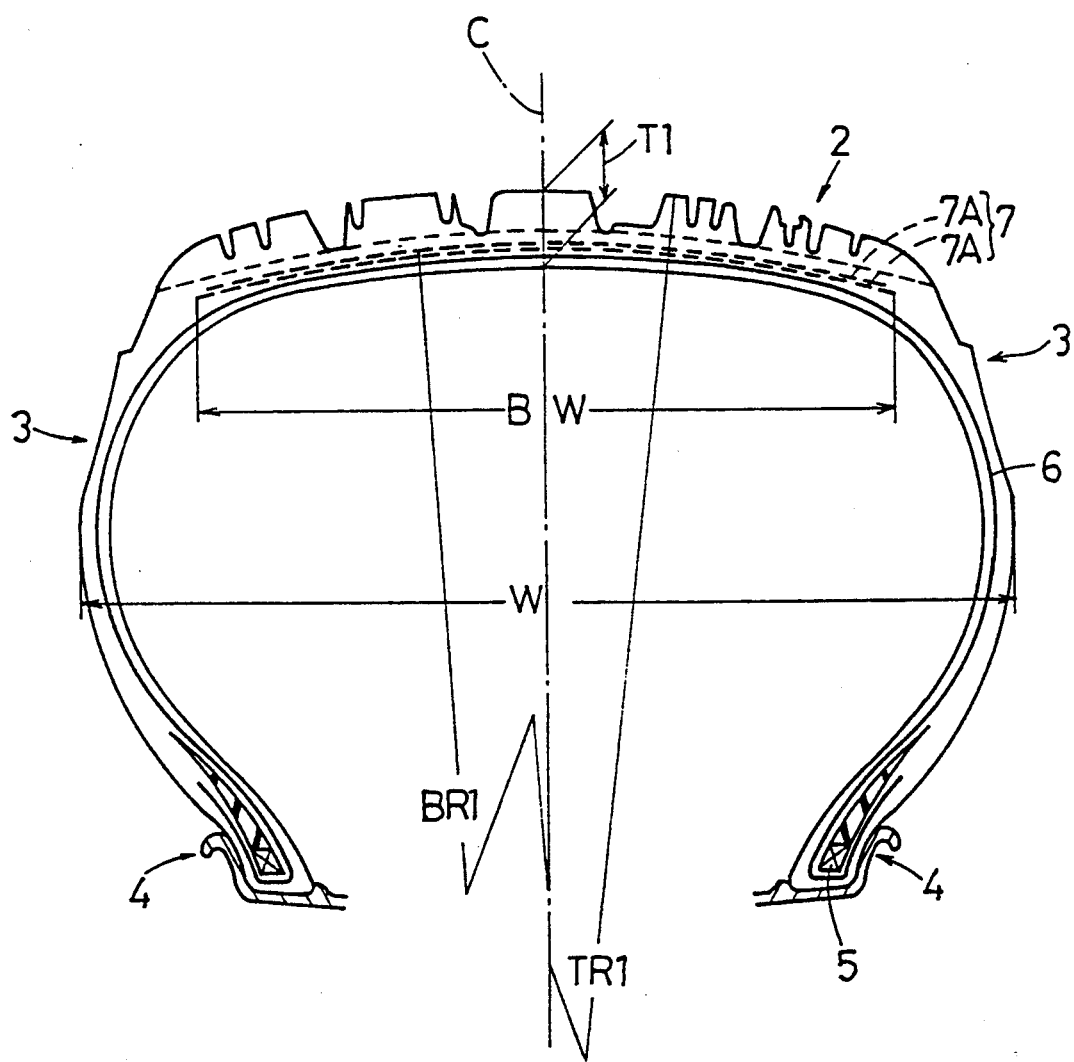
FIG. 6 is a sectional view showing another embodiment of the invention.

In the tires for four-wheel drive vehicles running on a muddy or sandy field, the pneumatic radial the tire of the invention may be applied. To run on a muddy or sandy field, tire is used at a relatively lower inner pressure against the load as compared with general tires for on-road traveling as shown in FIG. 6. And the bending rigidity is set lower than in the general tires. Furthermore, in the tires for four-wheel drive vehicles, a block pattern of plural blocks is formed on the tread surface 2A by circumferential grooves, and lateral grooves disposed in the direction crossing with the circumferential grooves.

For use In such low internal pressure and high load, and traveling on a muddy or sandy field, In the tires for four-wheel drive vehicles having the parts of the tire body formed thinly as compared with the tire volume, it is desired to define the sea/land ratio, or the ratio of the groove part to the land part in the tread pattern, as well as the sectional thickness of the tread part.

In the embodiment, the thickness ratio T1/W of the overall thickness T1 of the tread part 2 on the tire equator C to the tire maximum width W is set in a range of 0.05 to 0.073. If the ratio is less than 0.05, the allowance for wear is too small and the wear resistance is inferior, and if exceeding 0.073, the bending rigidity of the tread part is very large, and the floating effect may be inferior when traveling on a muddy or sandy field.

To enhance the floating effect, the sea/land ratio or the sum of land area/sum of groove area should be preferably 40/60 or more.

EXAMPLES

Tires (Embodiments 1, 2) in the tire size of 31×10.50R15 in the construction as shown in FIG. 1 were experimentally fabricated in the specification shown in Table 1. And the buckling amount Y was measured. Comparative tires in other specifications were also manufactured and the performances were compared. The buckling amount Y was measured in above mentioned the method. As a result of tests, the buckling amount Y was notably decreased in the embodiments as compared with the comparative examples.

TABLE 1

|  | Embodiment 1 | Embodiment 2 | Comparison 1 | Comparison 2 | Comparison 3 | Comparison 4 |
| --- | --- | --- | --- | --- | --- | --- |
| Tread radius of curvature (TR1) (mm) | 700 | 700 | 550 | 500 | 500 | 550 |
| Belt radius of curvature (BR1) (mm) | 550 | 630 | 350 | 340 | 500 | 640 |
| Ratio (TR1/BR1) | 1.27 | 1.08 | 1.57 | 1.47 | 1.00 | 0.86 |
| Product (TR1 × BR1) (mm$^2$) | $38.5 \times 10^4$ | $44.1 \times 10^4$ | $19.3 \times 10^4$ | $17.0 \times 10^4$ | $25.0 \times 10^4$ | $35.2 \times 10^4$ |
| Belt radius of curvature in loaded state (BR1) | 1200 | 3000 | 2000 | 700 | 800 | 1800 |
| Buckling amount (mm) | 0.94 | 0.54 | 5.65 | 6.04 | 3.67 | 4.24 |

I claim:

1. A pneumatic radial tire
having a sum of tire maximum width W and tire maximum diameter D defined in a range from 750 mm to 1250 mm and
comprising a carcass extending from a tread part, the tread part including a central part and a shoulder part axially outward of each side of the central part, through sidewall parts and turned up around a bead core in each of two bead parts, and a belt layer composed of at least one belt ply disposed radially outside the carcass, wherein, on the tire meridian section,
a tread surface is curved along a single arc with a curvature radius TR1 having a center on the tire's equatorial plane,
a radially outer surface of the belt layer is curved along a single arc with a curvature radius BR1 having a center on the tire's equatorial plane,
said curvature radius TR1 is larger than said curvature radius BR1,
a product of said curvature radius TR1 and said curvature radius BR1, that is, (TR1×BR1) is in a range from $33.7 \times 10^4$ mm$^2$ to $45.0 \times 10^4$ mm$^2$,
a tread rubber thickness of the tread center part between the radially outer surface of the belt layer and the tread surface is thinner than a tread rubber thickness of the tread shoulder part between the radially outer surface of the belt layer and the tread surface, the tread rubber thickness of the tread shoulder part being measured near the tread edge, and
a ratio T1/W of the total thickness T1 of the tread outer part on the tire equator from the tread surface to the radially inner surface of the tire to the tire maximum width W is in a range of 0.5 to 0.073.

* * * * *